United States Patent
Perlick et al.

(10) Patent No.: US 7,111,702 B2
(45) Date of Patent: Sep. 26, 2006

(54) STEERING ANGLE CONTROL OF INDEPENDENT REAR CLUTCHES IN A FOUR-WHEEL DRIVE VEHICLE

(75) Inventors: Mark A. Perlick, Shelby Township, MI (US); Dan J. Showalter, Plymouth, MI (US)

(73) Assignee: BorgWarner Inc., Auburn Hills, MI (US)

( * ) Notice: Subject to any disclaimer, the term of this patent is extended or adjusted under 35 U.S.C. 154(b) by 294 days.

(21) Appl. No.: 10/307,611

(22) Filed: Dec. 2, 2002

(65) Prior Publication Data

US 2004/0104056 A1  Jun. 3, 2004

(51) Int. Cl.
*B60K 17/34* (2006.01)

(52) U.S. Cl. .................. 180/233; 180/245; 180/247

(58) Field of Classification Search ............. 180/197, 180/233, 244–249; 701/69–71, 89, 90
See application file for complete search history.

(56) References Cited

U.S. PATENT DOCUMENTS

| | | | |
|---|---|---|---|
| 4,754,835 A | 7/1988 | Stelter et al. | |
| 4,770,266 A | 9/1988 | Yamaguchi et al. | |
| 4,921,065 A | 5/1990 | Hamada et al. | |
| 5,058,700 A | 10/1991 | Shibahata | |
| 5,065,835 A * | 11/1991 | Richter et al. | 180/197 |
| 5,065,836 A | 11/1991 | Hamada et al. | |
| 5,105,901 A | 4/1992 | Watanabe et al. | |
| 5,184,695 A * | 2/1993 | Matsuda et al. | 180/233 |
| 5,332,059 A | 7/1994 | Shirakawa et al. | |
| 5,332,300 A * | 7/1994 | Hartmann et al. | 303/146 |
| 5,341,893 A | 8/1994 | Fukui et al. | |
| 5,407,024 A * | 4/1995 | Watson et al. | 180/248 |
| 5,497,845 A * | 3/1996 | Shibahata | 180/76 |
| 5,636,121 A * | 6/1997 | Tsuyama et al. | 701/70 |
| 5,685,386 A * | 11/1997 | Kondo et al. | 180/76 |
| 5,701,247 A * | 12/1997 | Sasaki | 701/1 |
| 5,741,917 A * | 4/1998 | Buhring | 554/92 |
| 5,850,616 A * | 12/1998 | Matsuno et al. | 701/82 |
| 6,076,033 A | 6/2000 | Hamada et al. | |
| 6,095,276 A * | 8/2000 | Kuroda et al. | 180/247 |
| 6,098,770 A | 8/2000 | Isley, Jr. | |
| 6,145,614 A | 11/2000 | Kimura et al. | |
| 6,327,935 B1 | 12/2001 | Joslin et al. | |
| 6,587,775 B1 * | 7/2003 | Nishida et al. | 701/89 |
| 6,851,501 B1 * | 2/2005 | Gassmann | 180/248 |

* cited by examiner

*Primary Examiner*—Lesley D. Morris
*Assistant Examiner*—L. Lum
(74) *Attorney, Agent, or Firm*—Brinks Hofer Gileon & Lione; Greg Dziegielewski

(57) ABSTRACT

A method and apparatus for a four-wheel drive motor vehicle provides improved cornering by disengaging drive torque to the inside rear wheel during significant steering maneuvers. The apparatus includes a primary front wheel drive motor vehicle driveline having a center differential which provides drive energy to the primary (front) driveline and secondary (rear) driveline and a rear axle assembly having a pair of normally engaged (active) clutches which provide drive energy to the respective rear wheels. A steering angle sensor detects angular displacement of the steering column or front (steering) wheels and an associated controller disengages the clutch associated with the rear wheel on the inside of the turn as determined by the steering angle sensor.

17 Claims, 3 Drawing Sheets

STEERING ANGLE CONTROL OF INDEPENDENT REAR CLUTCHES IN A FOUR-WHEEL DRIVE VEHICLE

BACKGROUND OF THE INVENTION

The invention relates generally to a method and apparatus for controlling torque delivery in a motor vehicle in response to steering angle and more particularly to a method and apparatus for independently controlling rear axle clutch activity and torque delivery to the rear wheels of a four-wheel drive motor vehicle in response to the angle at the front (steering) wheels.

Extensive effort has been directed to many aspects of vehicle control and performance in vehicles equipped with adaptive four-wheel drive systems. Since the opportunity exists in vehicles equipped with four-wheel drive systems to monitor and control torque application to all four vehicle wheels rather than simply two wheels, as in many vehicles, the opportunity to significantly enhance the performance and performance characteristics of such vehicles also exists.

Many patented systems address and exploit the capabilities of four-wheel drive systems in manners intended to, for example, provide skid control, provide optimum acceleration and deceleration, or provide maximum acceleration and deceleration subject to maintaining vehicle control.

In addition to skid or slip sensing and control, a recent area of patent activity can be characterized as control of vehicle yaw, that is, motion of the vehicle about its Z or center, vertical axis.

For example, U.S. Pat. No. 5,332,059 teaches a four-wheel drive vehicle control system having a steering angle sensor and a clutch disposed across a rear differential. The clutch inhibits differentiation in response to sensed vehicle speed, steering angle and longitudinal and lateral acceleration.

U.S. Pat. No. 5,341,893 discloses a four-wheel drive system for a vehicle such as a tractor wherein a front differential drives left and right front wheels and torque is supplied to the rear wheels through individual clutches.

U.S. Pat. No. 6,076,033 teaches a process for controlling yaw in a motor vehicle through the generation of mutually exclusive braking and driving forces on the left and right wheels of a vehicle.

Another four-wheel drive system appears in U.S. Pat. No. 6,145,614 which discloses a four-wheel drive system having a center differential with a differentiation inhibiting device disposed across the differential and a second differential at the primary axle which also has a differentiation inhibiting clutch disposed thereacross. The system also includes a turn sensor and means for adjusting the extent of differentiation inhibition depending upon the speed difference between the right and left main drive wheels.

From the foregoing survey of patents directed to motor vehicle yaw control, it is apparent that improvements to the subject art are desirable.

BRIEF SUMMARY OF THE INVENTION

A method of operating and apparatus for a four-wheel drive motor vehicle provides improved cornering by disengaging a clutch providing drive torque to the inside rear wheel of a four wheel drive motor vehicle during significant steering maneuvers. The apparatus includes a primary front wheel drive motor vehicle driveline having a center differential which provides drive torque to the primary (front) driveline and secondary (rear) driveline and a rear axle assembly having a pair of normally engaged (active) clutches which provide drive torque to the respective rear wheels. A steering angle sensor detects angular displacement of the steering column or front (steering) wheels and an associated controller disengages the clutch associated with the rear wheel on the inside of the turn as determined by the steering angle sensor. A turning moment is thus generated which reduces the acknowledged tendency of front-wheel drive vehicles to understeer.

Thus it is an object of the present invention to provide an apparatus for controlling individual clutches in the rear axle of a four-wheel drive motor vehicle in response to steering angle.

It is a further object of the present invention to provide a method for independently controlling two rear axle clutches in a four-wheel drive motor vehicle in response to steering angle.

It is a still further object of the present invention to provide a method for sensing the angle of a steering column or steering wheel with a sensor and disengaging that one of a pair of clutches associated with the rear wheel of a four-wheel drive vehicle on the inside of a turn.

It is a still further object of the present invention to provide a steering angle sensor, a controller and a pair of independently operable clutches associated with each rear wheel of a four-wheel drive motor vehicle having a center differential.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
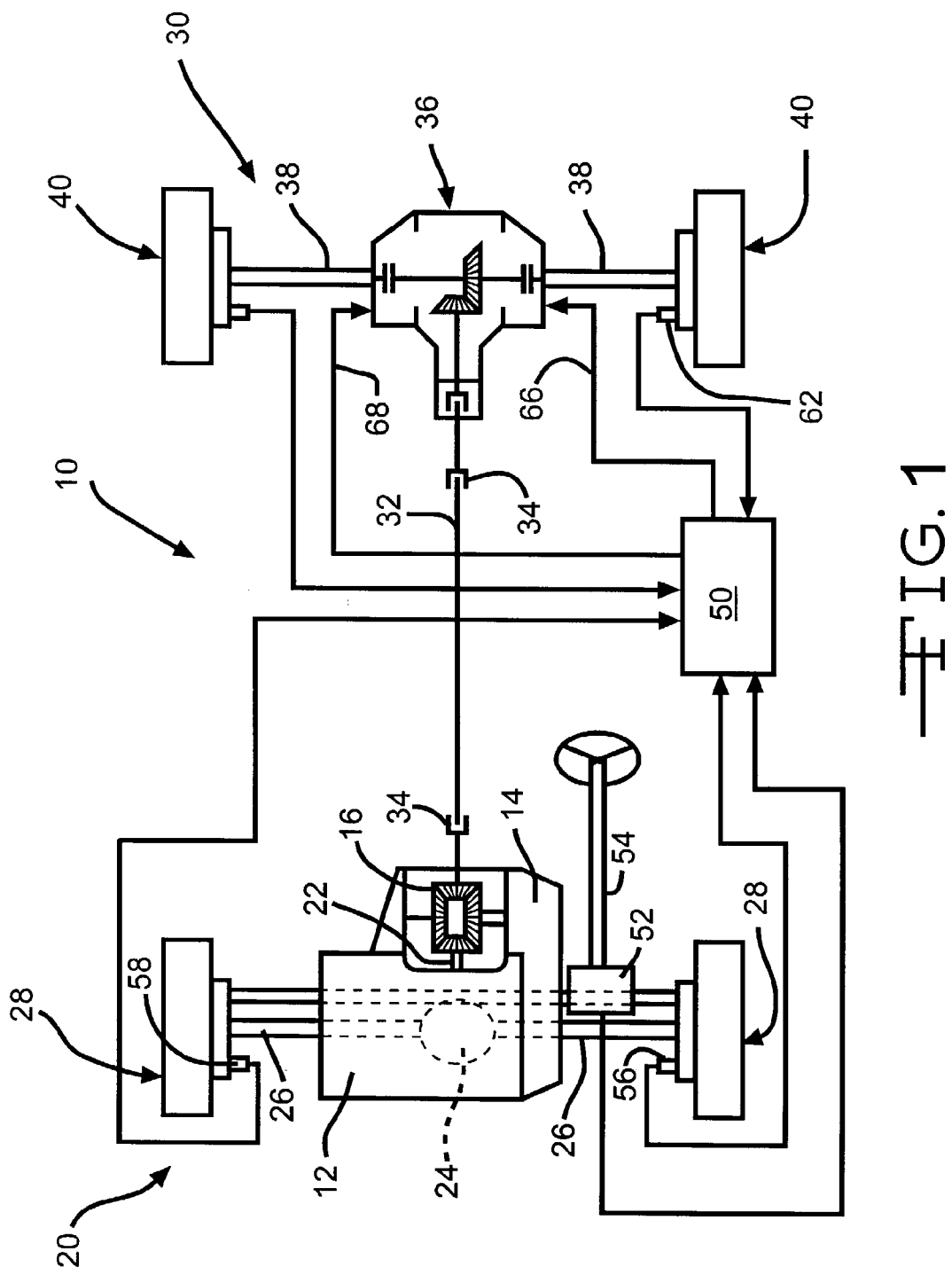
FIG. 1 is a diagrammatic view of an adaptive vehicle drive system of a four-wheel vehicle incorporating a twin clutch rear axle according to the present invention.

Referring now to FIG. 1, an adaptive four-wheel vehicle drive train is diagrammatically illustrated and designated by the reference numeral 10. The four-wheel vehicle drive train 10 includes a prime mover 12 which is coupled to and directly drives a transaxle 14. The output of the transaxle 14 drives a center differential 16 which provides motive power to a primary or front drive line 20 comprising a front or primary propshaft 22, a front or primary differential 24, a pair of live front axles 26 and a respective pair of front tire and wheel assemblies 28. It should be appreciated that the front or primary differential 24 is conventional.

The center differential 16 also provides motive power to a secondary or rear drive line 30 comprising a secondary propshaft 32 having appropriate universal joints 34, a rear or secondary axle assembly 36, a pair of live secondary or rear axles 38 and a respective pair of secondary or rear tire and wheel assemblies 40. As utilized herein with regard to the secondary axle assembly 36, the term "axle" is used to identify and include a device commonly referred to as a differential, i.e., a device for receiving drive line torque, distributing it to two transversely disposed wheels and accommodating rotational speed differences resulting from, inter alia, vehicle cornering. As such, the term "axle" is intended to include the present invention which provides these functions but which does not include a conventional caged differential gear set.

The foregoing and following description relates to a vehicle wherein the primary drive line 20 is disposed at the front of the vehicle and, correspondingly, the secondary drive line 30 is disposed at the rear of the vehicle, such a vehicle commonly being referred to as a (primary) front wheel drive vehicle or adaptive four-wheel drive vehicle.

Associated with the vehicle drive train 10 is a controller or microprocessor 50 which receives signals from at least one sensor and provides two independent control, i.e., actuation, signals to the rear or secondary axle assembly 36. Specifically, a steering angle sensor 52 senses the angular position of the steering column 54 and provides an appropriate signal to the microprocessor 50. Since there is typically a direct and positive linkage between the steering column 54 and the front (steering) tire and wheel assemblies 28, the angular position of the front tire and wheel assemblies can be directly inferred and, in fact, computed from the information provided by the steering angle sensor 52. Thus, it should be understood that rotation of the steering column 54 and thus movement of the steering angle sensor 52 in degrees will always be a corresponding or related and larger angular value than the angular movement of the front tire and wheel assemblies 28. Scaling factors in the microprocessor 50 can readily convert angular position of the steering column 54 to angular position of the front (steering) tire and wheel assemblies 28. Due to such ready conversion and because steering and suspension engineers typically refer to the angle of the steering (front) wheels rather than the angular position of the steering wheel and steering column 54 when referring to "steering angle," this convention will be adhered to in this disclosure, it being understood that both the angle of the steering column 54 and angle of the front tire and wheel assemblies 28 of a given vehicle are related by a known relationship or ratio, as noted above, and that either may be sensed, if desired, and scaled and converted as appropriate. Furthermore, a linear sensor (not illustrated) operably linked to a steering rack, tie rod or other steering component exhibiting linear motion will function in this system. Lastly, in steer-by-wire systems, the microprocessor 50 may be fed a signal front the steering angle sensor 52 of the steer-by-wire system.

Optionally, the drive train 10 may include a first variable reluctance or Hall effect sensor 56 senses the rotational speed of the left primary (front) tire and wheel assembly 28 and provides a signal to the microprocessor 50. A second variable reluctance or Hall effect sensor 58 senses the rotational speed of the right primary (first) tire and wheel assembly 28 and provides a signal to the microprocessor 50. A third variable reluctance or Hall effect sensor 62 associated with the left secondary (rear) tire and wheel assembly 40 senses its speed and provides a signal to the microprocessor 50. Finally, a fourth variable reluctance or Hall effect sensor 64 associated with the right secondary (rear) tire and wheel assembly 40 senses its speed and provides a signal to the microprocessor 50. It should be understood that the speed sensors 56, 58, 62 and 64, in addition to being optional, may be independent, i.e., dedicated, sensors or may be those sensors mounted in the vehicle for anti-lock brake systems (ABS) or other speed sensing and traction control systems. It is also to be understood that an appropriate and conventional counting or tone wheel (not illustrated) is associated with each of the respective tire and wheel assemblies 28 and 40 in proximate sensing relationship with each of the speed sensors 56, 58, 62 and 64.

As noted, the speed sensors 56, 58, 62 and 64 are optional, both from the standpoint of requiring all four, as typically one or two will provide sufficient data from which, for example, the vehicle speed may be determined, or none at all, as the system is capable of operation without vehicle speed data, i.e., independent of vehicle speed. The microprocessor 50 includes software which receives and may condition the signals from the steering angle sensor 52 and the wheel speed sensors 56, 58, 62 and 64.

Figure 2:
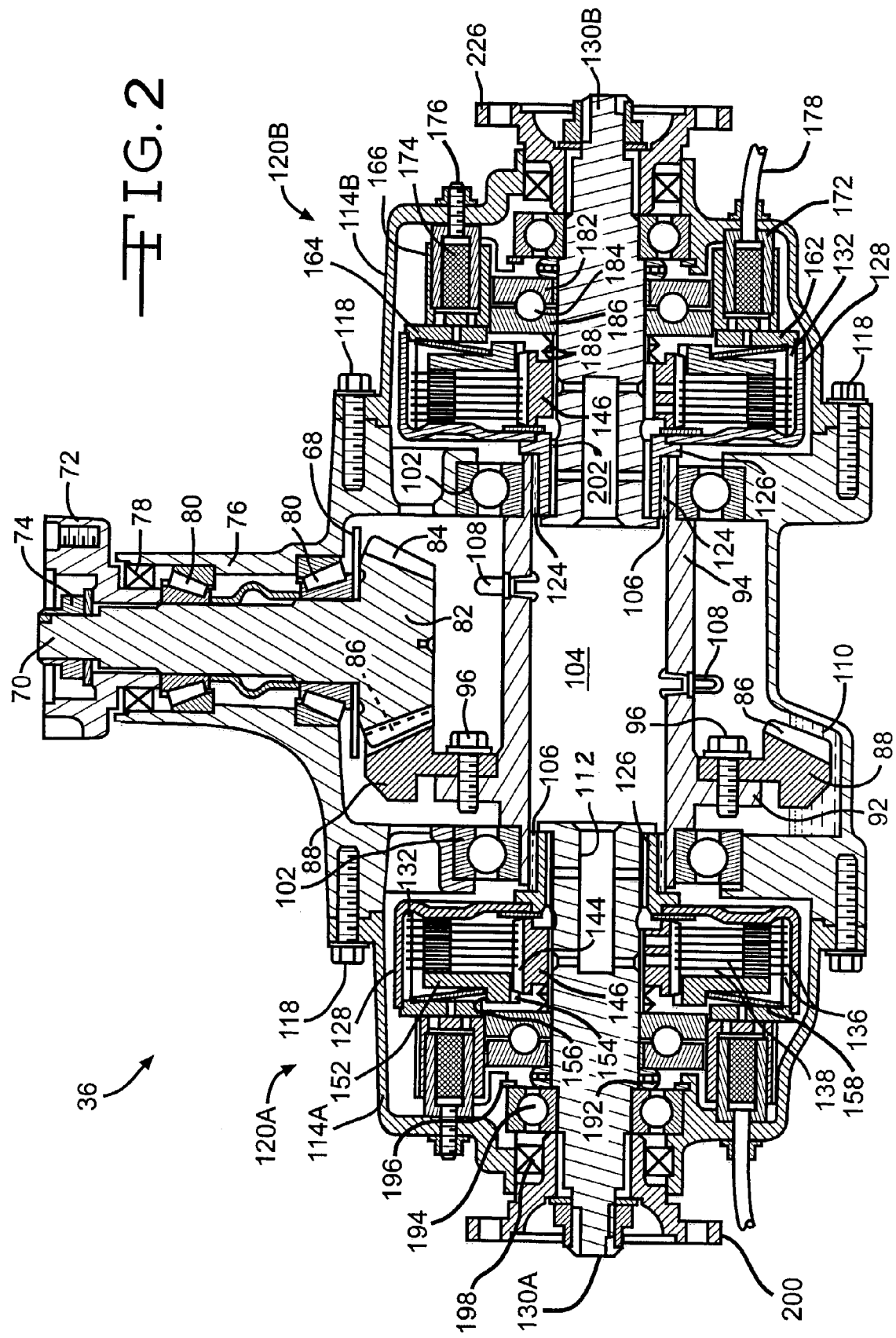
FIG. 2 is a full, sectional view of a twin clutch rear axle according to the present invention and, FIG. 3 is a graph illustrating clutch engagement versus angle of the front (steering) vehicle wheels.

Referring now to FIG. 2, the rear or secondary axle assembly 36 includes an input shaft 70 which receives drive torque from the secondary propshaft 32. The input shaft 70 may include a flange 72 or similar component which forms a portion of, for example, a universal joint 34 or other connection to the secondary propshaft 32. The flange 72 may be retained on the input shaft 74 by a lock nut 74. The input shaft 70 is received within a centrally disposed, axially extending center housing 76 and is surrounded by a suitable oil seal 78 which provides a fluid impervious seal between the housing 76 and the input shaft 70 or an associated portion of the flange 72. The input shaft 70 is preferably rotatably supported by a pair of anti-friction bearings such as the tapered roller bearing assemblies 80. The input shaft 70 terminates in a hypoid or beveled gear 82 having gear teeth 84 which mate with complementarily configured gear teeth 86 on a ring gear 88 secured to a flange 92 on a centrally disposed tubular drive member 94 by suitable fasteners 96.

The tubular drive member 94 is rotatably supported by a pair of anti-friction bearings such as ball bearing assemblies 102. The tubular drive member 94 is hollow and defines an interior volume 104. At each end of the tubular drive member 94 generally within the interior volume 104 are disposed sets of female or internal splines or gear teeth 106. A pair of scavengers or scoops 108 extend radially through the wall of the tubular drive member 94 and collect a lubricating and cooling fluid 110 driving it into the interior volume 104. The lubricating and cooling fluid 110 is then provided to components in the rear differential assembly 36 through passageways 112 in communication with the interior volume 104.

The rear or secondary axle assembly 36 also includes a pair of bell housings 114A and 114B which are attached to the center housing 76 by threaded fasteners 118. The housings 114A and 114B are mirror-image, i.e., left and right, components which each receive a respective one of a pair of modulating clutch assemblies 120A and 120B. But for the opposed, mirror-image arrangement of the two modulating clutch assemblies 120A and 120B, the components of the two clutch assemblies 120A and 120B described below are identical. Accordingly, and for purposes of clarity in FIG. 2, numerical component callouts may appear in either or both of the left and right clutch assemblies 120A and 120B, it being understood that such components and callouts reside in and refer to both assemblies.

Each of the modulating clutch assemblies 120A and 120B is driven by the tubular drive member 94 which includes the two sets of internal splines or gear teeth 106 which engage complementarily configured male splines or gear teeth 124 on a respective tubular sleeve or collar 126. The sleeves or collars 126 include splines or gear teeth (not illustrated) which engage complementary features on a respective pair of clutch end bells 128. The clutch end bells 128 are identical but disposed in mirror-image relationship on opposite ends of the tubular drive member 94. The interior, circumferential surface of each end bell 128 defines a plurality of axially extending female splines 132 which are engaged by and rotationally drive a first plurality of clutch discs or plates 136. The first plurality of clutch discs or plates 136 include suitable frictional material and surfaces and are interleaved with a second plurality of smaller diameter clutch discs or plates 138 which also include suitable frictional material and surfaces. The second plurality of clutch discs or plates include female splines which engage and rotationally couple them to male splines 144 disposed on an annulus or collar 146. The collar 146 is disposed upon and coupled to an output shaft 130B by a set of interengaging splines 148.

The modulating clutch assemblies 120A and 120B also each include a circular apply plate 152 which includes female splines or internal gear teeth 154 which mate with the male splines 144 on the collar 146. The apply plate 152 thus rotates with the second plurality of clutch plates 138 and may move axially relative thereto. The apply plate 152 may include a shoulder 156 which positions and receives a flat washer 158 which engages an armature 162. The armature 162 includes male splines 164 about its periphery which are complementary to and engage the female splines 132 on the interior of the end bell 128. Thus, the armature 162 rotates with the end bell 128 and the first plurality of clutch plates 136. The armature 162 is disposed adjacent a U-shaped circular rotor 166. The rotor 166 partially surrounds a stationary housing 172 which contains an electromagnetic coil 174. The stationary housing 172 and the coil 174 are preferably secured to the bell housings 114A and 114B by a plurality of threaded studs and fasteners 176. Electrical energy may be provided to the electromagnetic coil 174 through a conductor 178.

Coupled to the rotor 166 by any suitable means such as weldments, interengaging splines or an interference fit is a first circular member 182. The first circular member 182 defines a loose, freely rotating fit about the output shaft 130B and thus the first circular member 182 and the rotor 166 are free to rotate about both the output shaft 130B and the housing 172 of the electromagnetic coil 174. The first circular member 182 includes a plurality of curved ramps or recesses arranged in a circular pattern about the axis of the output shaft 130B. The ramps or recesses represent oblique sections of a helical torus. Disposed within each of the recesses is a load transferring ball 184 or similar load transferring member which rolls along the ramps defined by the oblique surfaces of the recesses.

A second circular member 186 is disposed in opposed relationship with the first circular member 182 and includes a like plurality of complementarily sized and arranged recesses. The load transferring balls 184 are thus received and trapped within the pairs of opposing recesses, the ends of the recesses being curved and much steeper in slope than the interior regions of the recesses such that the load transferring balls 184 are effectively trapped therein. A plurality of wave washers or Belleville springs 188 are disposed between the second circular member 186 and the collar 146 and bias the second circular member 186 toward the first circular member 182.

It will be appreciated that the recesses and the load transferring balls 184 may be replaced with other analogous mechanical elements which cause axial displacement of the circular members 182 and 186 in response to relative rotation therebetween. For example, tapered rollers disposed in complementarily configured conical helices may be utilized.

The second circular member 186 includes a plurality of female splines or gear teeth which are complementary to and engage the male splines or external gear teeth 148 on the output shaft 130B. The axial position of the first circular member 182 is established by a thrust bearing assembly 192. Adjacent the thrust bearing assembly 192 is an anti-friction bearing such as a ball bearing assembly 194 which rotatably supports and axially locates the output shaft 130B. The ball bearing assembly 194 is retained by a pair of snap rings 196 and axially positions the output shaft 130B relative to the bell housing 114B. Adjacent the ball bearing assembly 194 and the terminus of the output shaft 130B is an oil seal 198. The terminal portion of the output shaft 130B may include a flange 200 or other component which facilitates driving connection to the rear axles 38. The opposite end of the drive shafts 130A and 130B are rotatably supported in a cylindrical journal bearing or bushing 202 received within the sleeves or collars 126.

Figure 3:
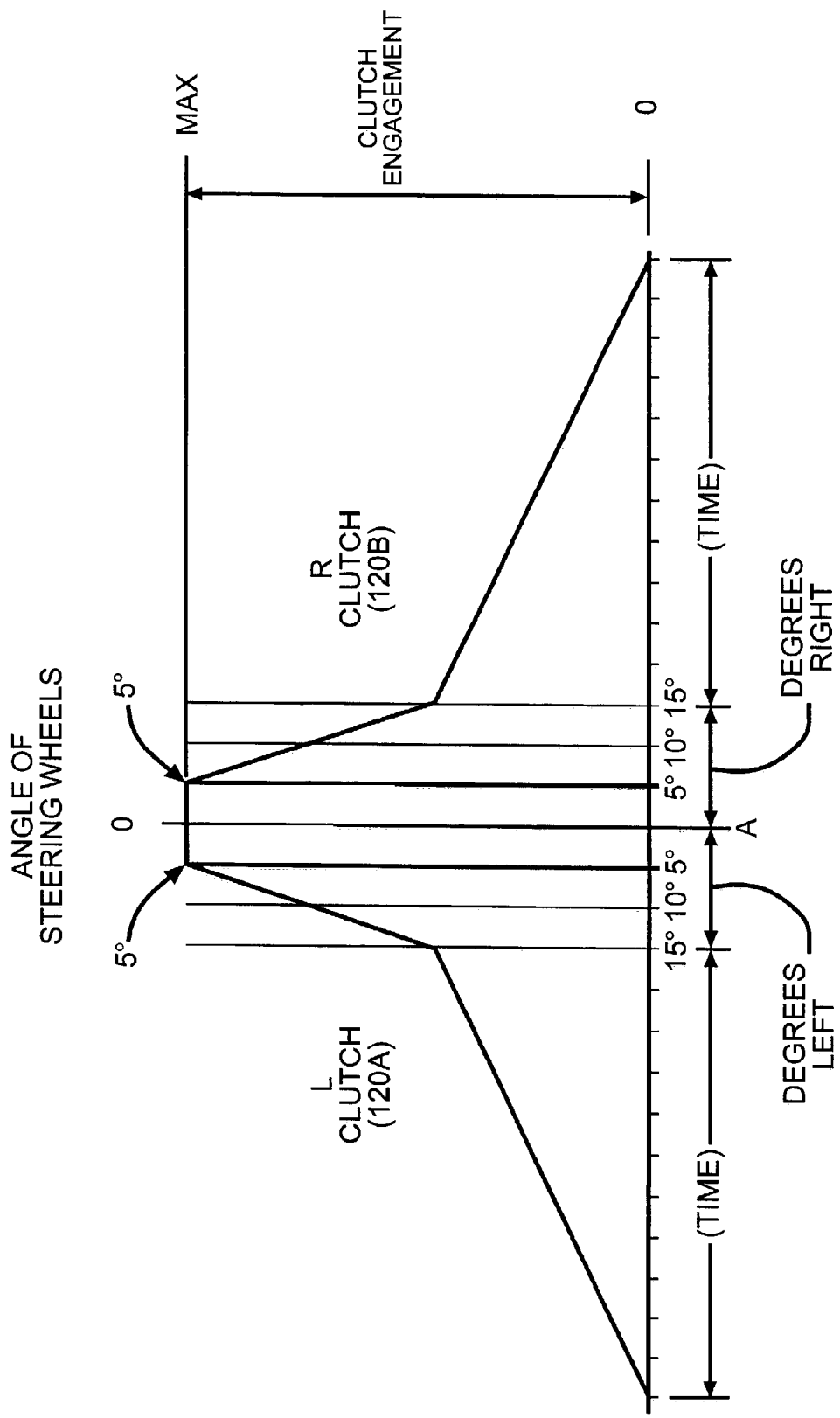

Referring now to FIG. 3, the method of operation of the present invention will be described. Such method of operation will be embodied within and occur through the agency of computer software or computer programs stored within the microprocessor 50 in accordance with conventional practice. The steering angle sensor 52 which is associated with the steering column 54 provides a signal to the microprocessor 50 representing the current angular position of the steering column 54 and thus of the front (steering) tire and wheel assemblies 28. As noted previously, there is a direct ratio or relationship between the angular position of the steering column 54 and the angular disposition of the front tire and wheel assemblies 28 which is established by the steering linkage. However, because the steering column rotates a greater angular extent than the front tire and wheel assemblies 28, improved definition and detection of the extent of rotation can be achieved by sensing the steering column 54. Thus, this method of detecting the position of the front tire and wheel assemblies 28 is preferred.

As illustrated in FIG. 3, the software and control algorithm includes a small dead band on either side of the dead center or straight ahead position of the front (steering) tire and wheel assemblies 28. This dead band both presumes that minor angular variations in the steering wheels do not require action on behalf of the system and further, that if such action did occur, it might be more distracting than beneficial. Typically, the dead band extends from zero to five degrees both left and right of dead center. However, it should be appreciated that the performance of certain vehicles and applications may be improved with the dead band reduced by as much as fifty percent or increased by as much as one hundred percent.

When the dead band is exceeded in either direction of rotation, the modulating clutch assembly 120A or 120B residing on the inside of the turn or curve is then commanded by the software and algorithm microprocessor 50 to commence disengagement. Such disengagement occurs preferably linearly over approximately ten degrees of angular motion of the front (steering) tire and wheel assemblies 28 from approximately five degrees to approximately fifteen degrees as set forth in FIG. 3. Once again, the ten degree range illustrated should be considered a nominal value and particular vehicles and applications may perform better when this angular interval is reduced by as much as fifty percent or increased by as much as one hundred percent.

Attainment of the pre-selected maximum angular displacement (fifteen degrees) of the front tire and wheel assemblies 58 will result in clutch engagement being reduced to approximately fifty percent. It should be understood that this clutch engagement value, as well, may be adjusted over a significant range (again typically fifty percent to two hundred percent) to optimize performance in a particular vehicle.

Upon attainment of the maximum angular displacement, (the knee or inflection point of the graphs illustrated in FIG. 3), further angular displacement of the front tire and wheel assemblies 28 no longer affects or further reduces clutch engagement. Rather, a time based algorithm takes over and, as long as the angle of the steering wheels 28 exceeds fifteen degrees or the particular selected value, the extent of clutch engagement continues to fall. After several seconds, with the position of the steering wheels 28 continuing to exceed fifteen degrees, clutch engagement will be reduced to zero. Clutch engagement will remain at zero until the front (steering) wheel angle reduces to approximately fifteen degrees. At this point, clutch engagement will ramp up and as the steering angle approaches five degrees, clutch engagement will increase until the steering angle reduces to approximately five degrees at which point the clutch will be fully re-engaged according to the engagement program illustrated in FIG. 3.

As noted above, a feature of the present invention is the reduction of understeer which is typical of a front-wheel drive vehicle. To achieve this reduction as well as provide optimum vehicle handling characteristics, it is necessary that the center differential 16 be configured to provide substantially two thirds of the delivered torque to the front driveline 20 and substantially one third of the torque to the rear or secondary driveline 30 under normal driving conditions. This torque distribution is not only consistent with, and roughly corresponds to the weight distribution of a front-wheel drive vehicle which tends to place approximately sixty percent of its weight upon the front wheels and approximately forty percent of its weight on its rear wheel but, more importantly, also provides optimum torque distribution of one third of the driving torque to each of the three driven wheels when one the rear modulating clutch assemblies 120A or 120B is disengaged. Moreover, application of such torque (one third to each of the front wheels 28 and one third of the driving torque to the rear outside wheel during a turn) provides a turning moment which tends to turn the vehicle in the direction of the steered wheels and thus, as noted above, reduces the understeer tendency of a typical front-wheel drive vehicle.

Although accurately described as modulating clutches, the assemblies 120A and 120B are locking clutches with very limited slip capabilities. This characterization reflects the fact that they are most generally energized or activated. When they are de-energized or de-activated, such change of operating mode occurs rather quickly, without extended periods of operation at an intermediate, i.e., modulating level. This has the benefit of reducing heat generation in the clutches.

Although the foregoing description of the preferred embodiment relates to a differential assembly 36 having twin clutch assemblies 120A and 120B with electromagnetic operators having electromagnetic coils 174, it should be understood that this embodiment and description are illustrative and exemplary only. Accordingly, modulating clutch assemblies 120A and 120B having hydraulic or pneumatic operators, i.e., piston and cylinder assemblies, with associated variable pressure fluid supplies are deemed to be within the scope of this invention.

Finally, while the preferred mode of operation is presented in FIG. 3, it is possible and may be desirable in certain applications to modify the operational curve therein illustrated in response to vehicle speed sensed by one of the sensors 56, 58, 62 or 64. For example, at higher vehicle speeds the width of the dead band may be reduced and/or the angle (slope) of the disengagement curve may be increased.

The foregoing disclosure is the best mode devised by the inventors for practicing this invention. It is apparent, however, that apparatus incorporating modifications and variations will be obvious to one skilled in the art of gear and clutch drive line components. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An adaptive drive system for a four-wheel drive vehicle comprising, in combination,
   a first driveline having a first prop shaft, a first differential driven by said first prop shaft and a first pair of axles and wheels driven by said first differential,
   a second driveline having a second prop shaft, a pair of electromagnetic clutches driven by said second prop shaft and a second pair of axles and wheels driven by a respective one of said pair of electromagnetic clutches,
   an open center differential having a first output driving said first driveline and a second output driving said second driveline,
   a steering angle sensor for providing a signal representing an angular position of said first pair of wheels, and
   control means for receiving said signal from said steering angle sensor and providing an independent output to each of said pair of electromagnetic clutches, said control means including a center dead band and effecting release of one of said pair of clutches on an inside of a turn as sensed by said steering angle sensor outside said dead band, said release outside said dead band in proportion to said angular position of said first pair of wheels.

2. The adaptive drive system of claim 1 further including a prime mover and a transmission having an output driving said open center differential.

3. The adaptive drive system of claim 1 wherein said steering angle sensor is operably associated with a vehicle steering column.

4. The adaptive drive system of claim 1 wherein said dead band is associated with a straight ahead position of said steering angle sensor.

5. The adaptive drive system of claim 1 wherein said second driveline includes a housing for receiving said pair of electromagnetic clutches and a bevel gear set.

6. The adaptive drive system of claim 1 wherein said open center differential distributes approximately two thirds of supplied torque to said primary driveline and approximately one third of supplied torque to said secondary driveline.

7. The adaptive drive system of claim 1 wherein said control means also disengages said clutches based on time.

8. An adaptive drive system for a four-wheel drive vehicle comprising, in combination,
   a primary drive line,
   a secondary driveline having left and right electromagnetic clutches driving a respective pair of left and right axles and wheels,
   an open center differential having a first output driving said primary driveline and a second output driving said secondary driveline,
   a steering angle sensor for providing a signal indicating a position of a steering component, and a microprocessor for receiving said signal from said steering angle sensor, providing a dead band and having a pair of outputs controlling a respective one of said pair of electromagnetic clutches, said microprocessor outputs operating outside said dead band to disengage said left clutch on a turn to the left as sensed by said steering angle sensor and disengage said right clutch on a turn to the right as sensed by said steering angle sensor, wherein said microprocessor disengages said electromagnetic clutches outside said dead band in proportion to said position of said steering component.

9. The adaptive drive system of claim 8 further including a prime mover and a transmission having an output driving said center differential.

10. The adaptive drive system of claim 8 wherein said open center differential distributes approximately two thirds of supplied torque to said primary driveline and approximately one third of supplied torque to said secondary driveline.

11. The adaptive drive system of claim 8 wherein said steering angle sensor is operably associated with a vehicle steering column.

12. The adaptive drive system of claim 8 wherein said dead band is associated with a straight ahead position of said steering angle sensor.

13. The adaptive drive system of claim 8 said second driveline includes a housing for receiving said pair of electromagnetic clutches and a bevel gear sat.

14. A method of operating an adaptive drive system comprising the steps of:

providing a front driveline and a rear driveline having a twin clutch axle;

providing an open center differential for delivering torque to said front and rear drivelines at a predetermined, fixed ratio;

providing a sensor for generating a signal representing an angular position of a steering component;

providing a microprocessor for receiving said sensor signal, creating a dead band at a substantially straight ahead position of said steering angle sensor; and providing an output to each of said twin clutches of said axle to engage said clutches when said steering angle sensor is disposed in said dead band and inhibiting said signal to one of said clutches on an inside of a turn outside said dead in proportion to said position of said steering angle sensor to release said one of said clutches.

15. The method of operating an adaptive drive system of claim 14 wherein said open center differential distributes approximately two thirds of supplied torque to said front driveline and approximately one third of said supplied torque to said rear driveline.

16. The method of operating an adaptive drive system of claim 14 wherein said microprocessor also disengages said clutches based on time.

17. The method of operating an adaptive drive system of claim 14 wherein said microprocessor includes a clutch disengagement program additionally based upon vehicle speed.

* * * * *